(12) United States Patent
Teimel

(10) Patent No.: US 8,845,202 B2
(45) Date of Patent: Sep. 30, 2014

(54) SPRING WASHER AND A BEARING BLOCK INCLUDING A SPRING WASHER

(75) Inventor: Arnold Teimel, Giswil (CH)

(73) Assignee: Maxon Motor AG, Sachseln (CH)

(*) Notice: Subject to any disclaimer, the term of this patent is extended or adjusted under 35 U.S.C. 154(b) by 16 days.

(21) Appl. No.: 13/426,352

(22) Filed: Mar. 21, 2012

(65) Prior Publication Data

US 2012/0243817 A1 Sep. 27, 2012

(30) Foreign Application Priority Data

Mar. 21, 2011 (EP) .................................... 11002309

(51) Int. Cl.
*F16C 25/08* (2006.01)
*F16C 1/18* (2006.01)
*F16C 27/00* (2006.01)
*F16F 1/32* (2006.01)

(52) U.S. Cl.
CPC ............... *F16C 25/083* (2013.01); *F16F 1/326* (2013.01); *F16C 2380/26* (2013.01)
USPC ............ 384/517; 384/519; 384/535; 384/563

(58) Field of Classification Search
USPC .......... 384/425, 427, 535, 563, 903; 267/161, 267/167
See application file for complete search history.

(56) References Cited

U.S. PATENT DOCUMENTS

| | | | |
|---|---|---|---|
| 1,323,188 A * | 11/1919 | Humphris ..................... | 411/164 |
| 2,922,000 A * | 1/1960 | Larsh ........................... | 200/80 R |
| 4,792,708 A | 12/1988 | Boyer | |
| 5,811,902 A * | 9/1998 | Sato ............................... | 310/90 |
| 5,959,381 A * | 9/1999 | Fischer et al. ................ | 384/204 |
| 6,024,177 A * | 2/2000 | Winebrenner .................. | 169/51 |
| 6,056,519 A * | 5/2000 | Morita et al. ................. | 417/415 |
| 7,367,786 B2 * | 5/2008 | Kang et al. .................... | 417/417 |
| 7,592,726 B2 * | 9/2009 | Heyder ............................ | 310/90 |
| 2005/0012417 A1* | 1/2005 | Fasterding et al. ............ | 310/90 |
| 2005/0285454 A1* | 12/2005 | Choi et al. ..................... | 310/14 |
| 2007/0102228 A1 | 5/2007 | Shiina et al. | |
| 2007/0257569 A1 | 11/2007 | Heyder | |

FOREIGN PATENT DOCUMENTS

| | | |
|---|---|---|
| CH | 240 887 A | 1/1946 |
| CN | 101010854 A | 8/2007 |
| DE | 298 01 110 U1 | 3/1998 |

(Continued)

OTHER PUBLICATIONS

Search Report issued on Jul. 18, 2011, by European Patent Office for Application No. 11002309.

(Continued)

*Primary Examiner* — Marcus Charles
(74) *Attorney, Agent, or Firm* — Buchanan Ingersoll & Rooney PC

(57) ABSTRACT

A spring washer is disclosed for axially preloading anti-friction bearings. The spring washer can include an outer ring and an inner ring that is coaxially arranged with respect to the outer ring. An axis is defined by the two rings. Outer and inner rings are connected through several resilient connection rods. Resilient cantilevered rods can be provided which extend from one of the rings in between the connection rods and which have a free end at the opposite positioned ring. Thereby, the cantilevered rods can be axially bent up such that the free end has an axial offset.

20 Claims, 4 Drawing Sheets

(56) References Cited

FOREIGN PATENT DOCUMENTS

Figure 1:
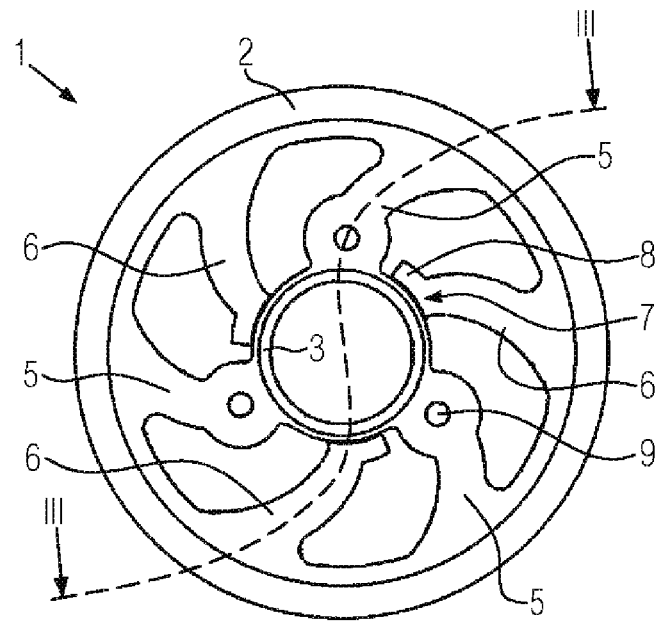

| DE | 102 14 276 A1 | 10/2003 |
| DE | 10 2004 041074 A1 | 3/2006 |
| EP | 0 303 147 A1 | 2/1989 |
| EP | 1 623 908 A1 | 2/2006 |
| FR | 2 608 708 A1 | 6/1988 |
| GB | 299 810 A | 10/1929 |
| WO | WO 02/092244 A1 | 11/2002 |

OTHER PUBLICATIONS

Office Action issued on Feb. 8, 2014, by the Chinese Patent Office in corresponding Chinese Patent Application No. 201210076547.0 and an English translation of the Office Action. (16 pages).

* cited by examiner

SPRING WASHER AND A BEARING BLOCK INCLUDING A SPRING WASHER

FIELD

The invention relates to a spring washer and a bearing block. Such a spring washer is used for the axial preload of anti-friction bearings. The spring washer comprises an outer ring as well as an inner ring that is coaxial to the outer ring. An axis is defined by means of these two rings. The outer and inner rings are connected through several resilient connection rods.

BACKGROUND INFORMATION

Such spring washers are used for the axial preload of anti-friction bearings of a bearing block. Such a bearing block commonly comprises a stationary component, a shaft and an anti-friction bearing that is located in between. An outer bearing ring of the anti-friction bearing is fixed to the aforementioned component, and an inner bearing ring of the anti-friction bearing is fixed to the shaft.

It is generally known from the prior art to preload anti-friction bearings axially by means of spring washers or conventional coil springs. The axial preload is necessary for numerous applications, since in the case of anti-friction bearings, especially radially grooved ball bearings, a radial play occurs between the balls and the outer and inner bearing ring. This play results in increased vibrations, especially at high rotational speeds. Because of this the bearing runs unsteadily, and in case of longer operations fretting wear is likely to occur due to the friction between the balls and the bearing rings. Thanks to axial preload this radial play can be avoided, since the bearing balls are in contact with the bearing rings due to the axial preload with a predefined contact angle between the ball's surface and the running track.

The axial preload by means of conventional compression coil springs has the disadvantage that compression coil springs are comparatively long and therefore require a large installation space.

Therefore, components which are referred to as spring washers have already been used for a long time for axial preloading. From EP 0303147 A1 a corrugated spring washer is known which is produced as stamped-bent part in one piece and basically comprises two concentrically arranged rings. The inner ring is connected to the outer ring by means of several connection rods. The inner ring is flat, whereas the outer ring is corrugated so it describes a sinusoidal curve alongside its perimeter in axial direction. The spring force is primarily produced due to the corrugated shape of the outer ring. Through the impact of axially applied force the corrugated outer ring is pressed flat so at maximum load the ring would be in-plane. Those corrugated spring washers have the disadvantage that in the course of time creeping occurs which is caused by a plastic deformation of the corrugated outer ring. This means that the spring force, which is produced by the corrugated spring washer, decreases over the course of time at the same rate of deflection.

CH 240887 describes a spring washer for the axial preload of an anti-friction bearing. The spring washer mainly consists of an outer ring from which inwardly directed cantilevered rods protrude, which are equally spread along the perimeter of the spring washer. Moreover, the cantilevered rods are bent up in axial direction and are pressed flat into the plane of the outer ring when exposed to axial load.

DE 10214276 A1 describes another spring washer, which is from its principal of operation similar to the spring washer from CH 240887. Here however, the continuous ring is located inside, whereas the resilient cantilevered rods of the inner ring protrude outwards. The resilient rods are also bent up axially.

DE 29801110 U1 presents a spring washer which is formed—similar to a coil spring—to a cone-shaped helical sheet metal strip which connects an outer ring to an inner ring. Since the outer and inner rings are only connected through a single spirally shaped rod, the rings are not solidly concentrically positioned and the rings can easily be tilted against one another. A spring force that is equally acting on the entire perimeter is impossible to achieve with this spring washer.

A spring washer of the type mentioned in the beginning is finally known from DE 102004041074 A1. It comprises an outer and inner ring which are concentrically arranged and connected through three resilient connection rods. The outer and inner ring have an axial offset and are therefore not in-plane. These three resilient connection rods are slightly spiral shaped in order to exhibit an adequate length for the intended spring effect. A similar spring washer of this type is described by WO 02/092244 A1.

In order to extend the length of the resilient connection rods U.S. Pat. No. 4,792,708 suggests implementing the connection rods in a snake shape. Each connection rod runs back and forth between the inner and outer ring alongside a specific part of the perimeter of the spring washer in a snake shape.

With the state of the art spring washers of the type mentioned in the beginning, the problem occurs that the length of the connection rods between the inner and outer ring of the spring washer cannot be altered lengthwise as required in order to achieve the requested spring effect, if there is only little installation space available especially in radial direction. The snake shaped version of the connection rods known from U.S. Pat. No. 4,792,708, for instance, leads to the fact that the inner ring cannot be kept stable and concentric to the outer ring. Therefore the object of the present invention is to improve the state of the art spring washers and especially indicate a possibility to extend the effective length of the resilient elements in order to achieve the requested spring effect without risking the stable and coaxial connection between the inner and outer ring. Moreover, the object of the present invention is to propose a spring washer with the smallest installation space possible and minor deviation of the spring characteristics in the case of full deflection, which on top of that can be manufactured cost-effectively.

SUMMARY

Resilient cantilevered rods are provided extending from one of the two rings in between the connections rods and having a free end at the opposite ring, wherein the cantilevered rods are axially bent up, such that the free end has an axial offset.

The invention makes an extension of the effective length of the resilient elements at an extremely small installation space possible, while at the same time a stable connection between the outer and inner rings is guaranteed especially with regards to the coaxial positioning of both rings. Even in the case of a maximum deflection or load, a deviation of the spring characteristics is for the inventive spring washer practically impossible. The inventive spring washer can be manufactured cost-effectively and in a simple way.

Advantageous embodiments of the present invention are subject to the subclaims.

In a preferred embodiment of the present invention, the connection rods and/or the cantilevered rods in a projection to a plane perpendicular to the axis of the spring washer are bent in at least one section. Thus an adequate length of the resilient rods necessary for achieving the required spring effect is also possible with radially small sized spring washers. The connection rods and/or cantilevered rods are especially preferred when bent in a spiral shape.

In another preferred embodiment of the present invention, the free end of the cantilevered rods has an extension which runs alongside the ring adjacent to the free end and which is bent axially back to this ring. Thus, in case of automated feeding of the spring washers, used for the installation of an electric motor, for instance, an interlocking of the spring washers is avoided.

According to another particularly preferred embodiment, the connection rods are equipped with axially protruding beads. Due to these beads, the pitch of the spring in axial direction can be limited if necessary.

Especially suitable materials for the manufacturing of the spring washer are Pfinodal, copper beryllium or spring steel, especially Durimphy or Durnico.

In another particularly preferred embodiment of the present invention, the spring washer is manufactured by means of stamp-bending. This makes an extremely simple and cost-effective manufacturing of the spring washer according to the invention possible.

For a stable connection of the inner and outer ring and for the most symmetric spring effect possible, the connection rods as well as the cantilevered rods are equally distributed over the perimeter of the spring washer. An equal amount of cantilevered rods and connection rods is particularly preferred. Thus the available installation space can be used to the full potential. For a symmetric spring effect it is of advantage, if each cantilevered rod is positioned between two resilient connection rods.

Moreover, the invention provides a bearing block with a stationary component, a shaft and an anti-friction bearing positioned in between, wherein an outer bearing ring of the anti-friction bearing is arranged on the stationary component and an inner bearing ring of the anti-friction bearing is arranged on the shaft and wherein according to the invention the anti-friction bearing is preloaded through an inventive spring washer.

According to a preferred embodiment of the present invention the anti-friction bearing used for this is a radially grooved ball bearing. The inventive bearing block is particularly, but not only, suitable for the bearing of a shaft of an electric motor, especially a small electric motor.

In a particular preferred embodiment of the present invention, the inner ring of the spring washer is fixed to the shaft, wherein the cantilevered rods extend from the outer ring and the free ends of the cantilevered rods resiliently abut to the inner bearing ring. Due to the fact that the spring washer is fixed to the shaft, the spring washer also functions as an axial securement for which an additional component is needed with known prior art solutions. It is pointed to the fact that the free ends of the cantilevered rods may abut to the inner bearing ring directly as well as indirectly.

In another particular preferred embodiment of the present invention, the outer ring of the spring washer is fixed to the stationary component, wherein the cantilevered rods extend from the inner ring and the free ends of the cantilevered rods resiliently abut to the outer bearing ring. With this solution an additional component is not necessary for the axial securement either. It is again pointed to the fact that the free ends of the cantilevered rods may abut to the outer bearing ring directly as well as indirectly.

A simple and cost-effective assembly is achieved, if the ring that is connected to the shaft or the stationary component is welded, pressed or glued to the shaft or the stationary component.

In yet another particular preferred embodiment of the present invention, a thrust washer is positioned between the free ends of the cantilevered rods and the respective abutting bearing ring. To this end, the cantilevered rods indirectly abut to the respective bearing ring. Due to the providing of a thrust washer, the most equal preload possible along the entire perimeter is achieved.

BREIF DESCRIPTION OF THE DRAWINGS

Figure 2:
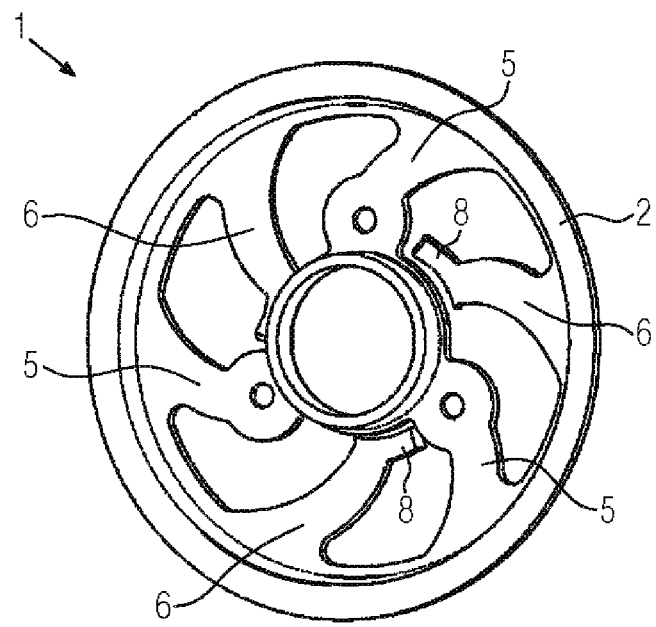
Figure 3:
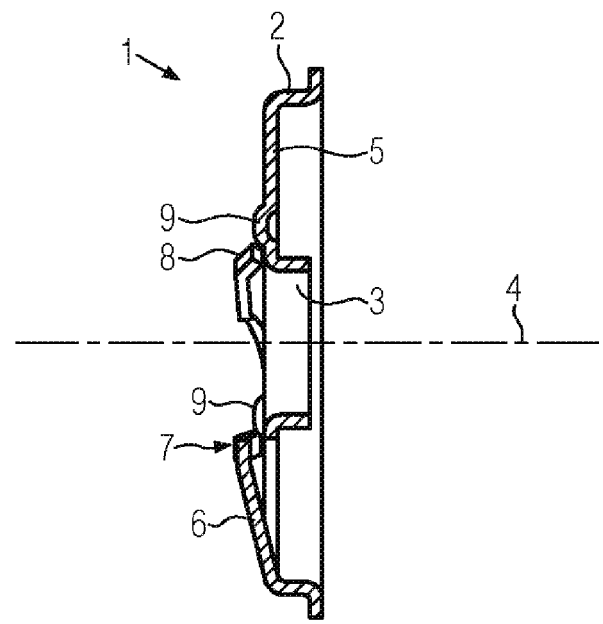
Figure 4:
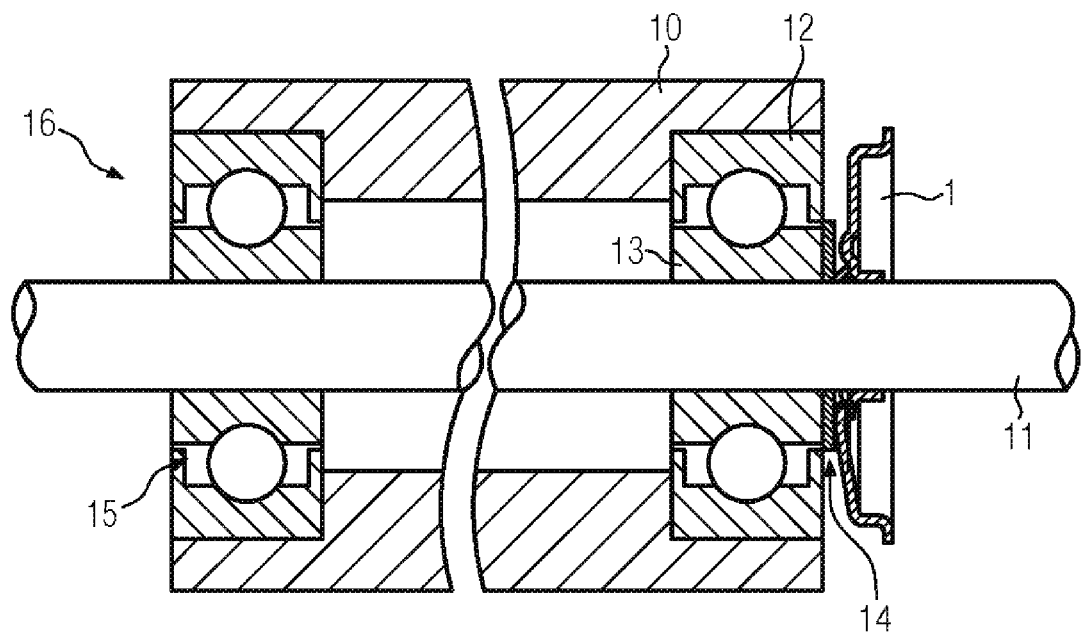
Figure 5:
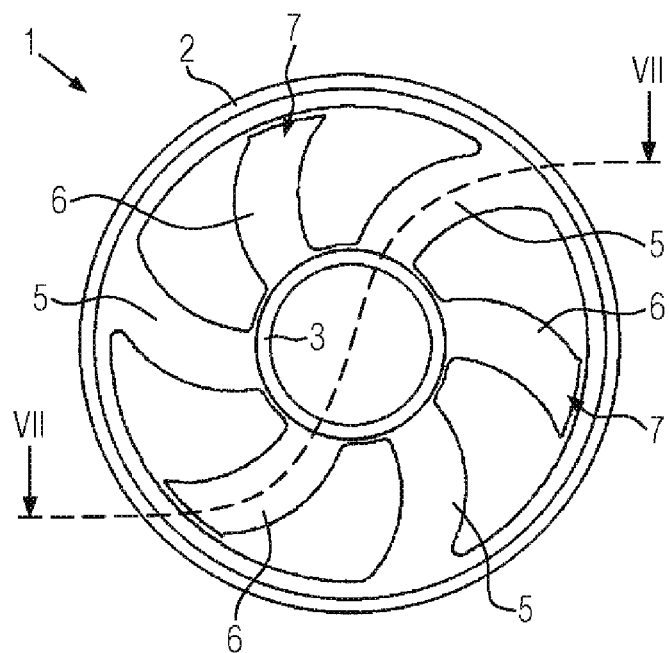
Figure 6:
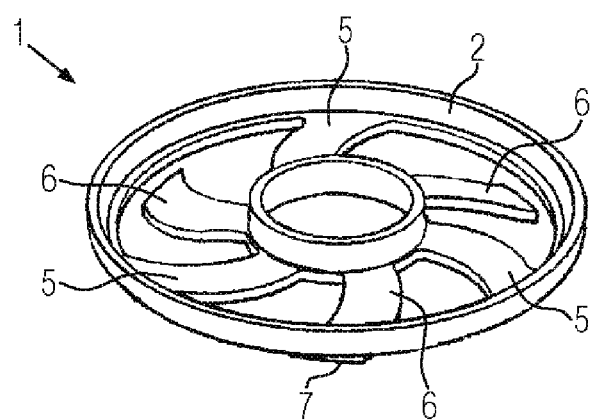
Figure 7:
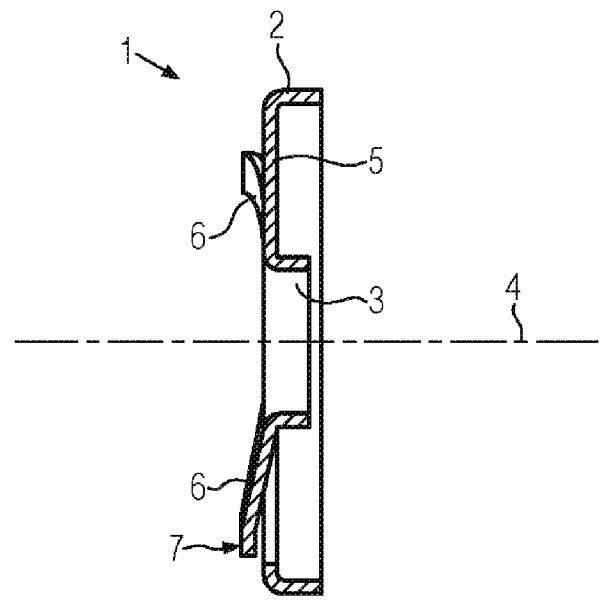
Figure 8:
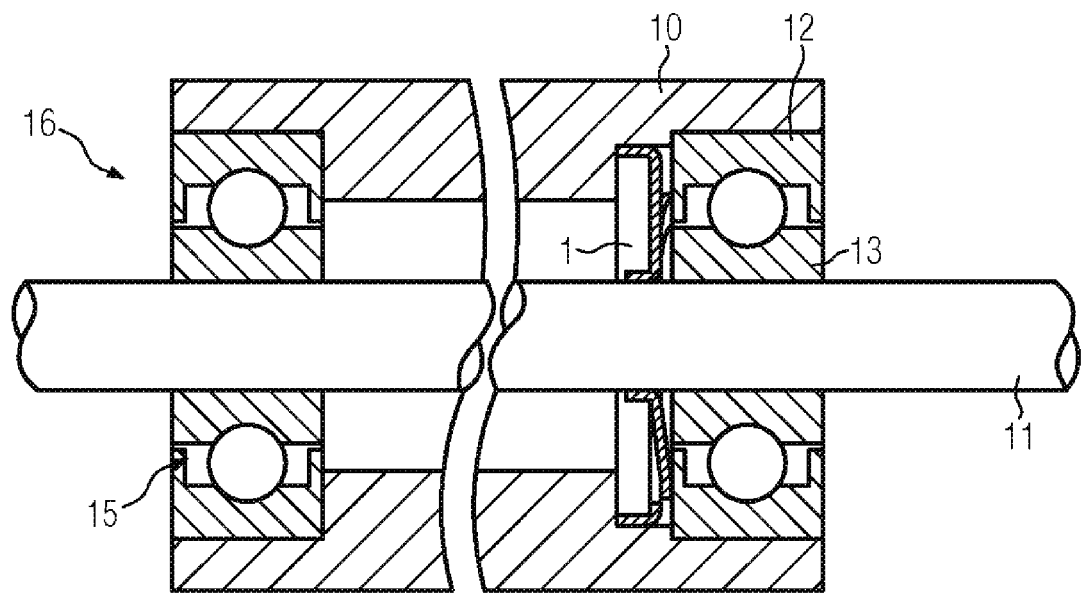

Embodiments of the present invention are described in more detail in the following drawings. They show:

FIG. 1 a plan view of a first embodiment of a spring washer according to the invention, FIG. 2 an oblique view of the inventive spring washer from FIG. 1, FIG. 3 an axial cut of the inventive spring washer from FIGS. 1 and 2, FIG. 4 a bearing block according to the invention with a spring washer according to the first embodiment of FIGS. 1 to 3, FIG. 5 a plan view of a second embodiment of a spring washer according to the invention, FIG. 6 an oblique view of the inventive spring washer from FIG. 5, FIG. 7 an axial cut of the inventive spring washer from FIGS. 5 and 6, FIG. 8 a bearing block with the inventive spring washer from FIGS. 5 to 7.

DETAILED DESCRIPTION

In the following explications same parts are always designated with same reference signs.

FIGS. 1 to 3 display a first embodiment of an inventive spring washer 1. The spring washer 1 consists of an outer ring 2 and an inner ring 3, which are concentrically arranged and are connected through three connection rods 5. As shown in FIG. 3, the connection rods 5 are in-plane. Both of the rings, i.e. the outer and inner ring, are formed as short cylindrical tube sections for reasons of stability. Moreover, the outer rim of the outer ring is bent outwards to an angle of 90 degrees, whereby the stability of the component is further increased. The displayed connection rods 5 are equally distributed along the perimeter of the spring washer 1 and run slightly spirally shaped from the inner ring 3 to the outer ring 2.

Between two fixed connection rods 5 there is additionally arranged one cantilevered resilient rod 6 which extends from the outer ring inwards and also is spirally shaped. At the inner ring 3, the cantilevered rods 6 have a free end 7 on which an extension 8 runs alongside the inner ring 3. FIG. 3 displays that the resilient cantilevered rods 6 are not in-plane with the fixed connection rods 5, but are bent up in the axial direction such that their free end 7 has an axial offset to the connection rods 6 or to both rings.

The fixed connection rods 6 as well as the cantilevered rods 5 contribute to achieving the spring effect of the spring washer 1. Thus the spring effect is generated between the free ends 7 of the cantilevered rods 6 and the inner ring 3. Furthermore, in FIG. 3 the axis 4 of the spring washer 1 is displayed. At the same time it forms the axis of both of the rings 2 and 3 which are concentrically arranged. Into the connection rods 6, axially protruding beads which reduce the pitch of the spring washer 1 are coined very close to the inner ring 3. These beads are designated with reference sign 9. It is also shown in FIG. 3 that the extensions 8 of the free ends 7 of the cantilevered rods 6 which run along the direction of the perimeter are axially bent backwards in direction of the inner ring 3. These extensions 8 prevent several spring washers 1 from interlocking. This is important, for example, for the automated feeding of the inventive spring washer during assembly.

FIG. 4 shows a bearing block 16 where the right bearing is axially preloaded by means of an inventive spring washer 1 according to FIGS. 1 to 3. The bearing block comprises a stationary, hollow-cylindrically shaped component 10 and a coaxially arranged rotating shaft 11. Such a bearing block is used for electric motors, for instance. By means of a fixed bearing 15 the rotating shaft 11 is pivoted at the left end in the stationary component 10. The locating bearing 15 is formed as a grooved ball bearing. It comprises an outer and an inner bearing ring wherein the outer bearing ring is fixed to the stationary component 10 and the inner bearing ring is fixed to the shaft 11. At the right end the floating bearing is located and it also consists of an outer bearing ring 12 and an inner bearing ring 13. The outer bearing ring 12 is fixed to the stationary component 10, however, the inner bearing ring 13 is axially relocatably arranged on the shaft 11. The inner bearing ring 13 is axially preloaded to the left by means of the inventive spring washer 1. For this purpose, the spring washer 1 is fixed to the shaft 11 by means of the inner ring 3. This connection can be produced, for example, by means of welding, gluing or pressing. The axial spring force is acted upon the inner bearing ring 13 by the free ends 7 of the cantilevered rods 6, which abut to the inner bearing ring 13 by means of a thrust washer 14. Due to the spring force of the spring washer 1 the inner bearing ring of the left fixed bearing 15 is also axially preloaded to the right.

A second embodiment of an inventive spring washer 1 is displayed in FIGS. 5 to 7. Here the cantilevered rods 6 are not fixed to the outer ring 2, but to the inner ring 3. The free ends 7 of the cantilevered rods 6 are thus arranged at the outer ring 2 of the spring washer 1. As shown in FIG. 7, the cantilevered rods 6 in this application example are also axially bent up such that their free ends 7 have an axial offset to the plane of the fixed connection rods 5 in the case of the stress-relieved state of the spring washer 1. In this embodiment the resilient connection rods 5 and the resilient cantilevered rods 6 also run in a slight spiral shape.

FIG. 8 displays a bearing block 16, similar to the bearing block from FIG. 4, wherein the axial preload of the floating bearing is achieved by means of a spring washer in compliance with the embodiment in FIGS. 5 to 7. In the case of the bearing block 16 displayed in FIG. 8, the inner bearing ring 13 of the right-hand floating bearing is also fixed to the shaft 11, whereas the outer bearing ring 12 of the right-hand floating bearing is axially relocatably held in the stationary component 10. The outer ring 2 of the spring washer 1 is fixed to a non-designated flange of the stationary component 10. Preferably this is also carried out by welding, gluing or pressing. The spring force of the spring washer 1 is acted upon the outer bearing ring 12 of the right-hand floating bearing by the free ends 7 of the cantilevered rods 6. In this embodiment, the inner ring 3 of the spring washer 1 is not fixed to the shaft 11, but is axially relocatable with respect the shaft 11. To this end, there is preferably only little play between the shaft 11 and the inner ring 3 of the spring washer 1.

The spring washer according to the invention as well as the bearing block according to the invention are preferably, but not exclusively, suitable for the application in small electric motors.

The invention claimed is:

1. Spring washer for axially preloading of anti-friction bearings, comprising:
an outer ring;
an inner ring coaxially arranged with respect to the outer ring;
an axis defined by the inner and outer rings, wherein the outer ring and the inner ring are connected through resilient connection rods and wherein the outer ring and the inner ring are formed as short cylindrical tube sections and the tube sections have a length greater than a thickness of the material which forms the respective tube sections; and
resilient cantilevered rods extending from one of the inner and outer rings in between the connection rods and having a free end at the other of the inner and outer rings, wherein the cantilevered rods are axially bent away from the inner and outer rings, such that the free end has an axial offset.

2. The spring washer according to claim 1, wherein at least one of the connection rods and the cantilevered rods are bent at least in one section in a projection to a plane perpendicular to the axis.

3. The spring washer according to claim 2, wherein free ends of the cantilevered rods have an extension which runs alongside the inner or outer ring adjacent to the free ends which are bent axially back to the inner or outer ring adjacent to the free end.

4. The spring washer according to claim 3, wherein the connection rods comprise:
axially protruding beads.

5. The spring washer according to claim 4, wherein the spring washer is manufactured form Pfinodal, copper beryllium or spring steel.

6. The spring washer according to claim 5, wherein the spring washer is stamped and bent.

7. The spring washer according to claim 1, wherein free ends of the cantilevered rods have an extension which runs alongside the inner or outer ring adjacent to the free ends which are bent axially back to the inner or outer ring adjacent to the free end.

8. The spring washer according to claim 1, wherein the connection rods comprise:
axially protruding beads.

9. The spring washer according to claim 1, wherein the spring washer is manufactured form Pfinodal, copper beryllium or spring steel.

10. The spring washer according to claim 1, wherein the spring washer is stamped and bent.

11. A spring washer in combination with a bearing block, the spring washer comprising:
an outer ring;
an inner ring coaxially arranged with respect to the outer ring;
an axis defined by the inner and outer rings, wherein the outer ring and the inner ring are connected through several resilient connection rods; and
resilient cantilevered rods extending from one of the inner and outer rings in between the connections rods and having a free end at the other of the inner and outer rings, wherein the cantilevered rods are axially bent away from the inner and outer rings, such that the free end has an axial offset;

wherein the bearing block comprises:

a stationary component;

a shaft; and an anti-friction bearing in between, wherein an outer bearing ring of the anti-friction bearing is arranged at the stationary component and an inner bearing ring of the anti-friction bearing is arranged on the shaft, the anti-friction bearing being preloaded by the spring washer and wherein, the connection rods as well as the cantilevered rods, contribute to the preload on the anti-friction bearing.

12. The spring washer and bearing block according to claim 11, wherein the inner ring of the spring washer is fixed to the shaft, wherein the cantilevered rods extend from the outer ring, and wherein the free ends of the cantilevered rods resiliently abut to the inner bearing ring.

13. The spring washer and bearing block according to claim 12, wherein a ring fixed to either the shaft or the stationary component is welded, pressed or glued to either the shaft or the stationary component.

14. The bearing block according to claim 13, comprising:
a thrust washer positioned between the free ends of the cantilevered rods and a respective abutting bearing ring.

15. The spring washer and bearing block according to claim 11, wherein the outer ring of the spring washer is fixed to the stationary component, wherein the cantilevered rods extend from the inner ring, and wherein free ends of the cantilevered rods resiliently abut to the outer bearing ring.

16. The spring washer and bearing block according to claim 15, wherein a ring fixed to either the shaft or the stationary component is welded, pressed or glued to either the shaft or the stationary component.

17. The bearing block according to claim 16, comprising:
a thrust washer positioned between the free ends of the cantilevered rods and a respective abutting bearing ring.

18. The bearing block according to claim 15, comprising:
a thrust washer positioned between the free ends of the cantilevered rods and a respective abutting bearing ring.

19. The bearing block according to claim 11, comprising:
a thrust washer positioned between free ends of the cantilevered rods and a respective abutting bearing ring.

20. A spring washer for axially preloading of anti-friction bearings, comprising:

an outer ring;

an inner ring coaxially arranged with respect to the outer ring;

an axis defined by the inner and outer rings, wherein the outer ring and the inner ring are connected through resilient connection rods and wherein the outer ring and the inner ring are formed as short cylindrical tube sections; and resilient cantilevered rods extending from one of the inner and outer rings in between the connection rods and having a free end at the other of the inner and outer rings, wherein the cantilevered rods are axially bent away from the inner and outer rings, such that the free end has an axial offset;

wherein free ends of the cantilevered rods have an extension which runs alongside the inner or outer ring adjacent to the free ends which are bent axially back to the inner or outer ring.

* * * * *